(12) United States Patent
Manuilov

(10) Patent No.: US 8,060,605 B1
(45) Date of Patent: Nov. 15, 2011

(54) SYSTEMS AND METHODS FOR EVALUATING THE PERFORMANCE OF REMOTE COMPUTING SYSTEMS

(75) Inventor: Konstantin Manuilov, Tallinn (EE)

(73) Assignee: Symantec Corporation, Mountain View, CA (US)

( * ) Notice: Subject to any disclaimer, the term of this patent is extended or adjusted under 35 U.S.C. 154(b) by 179 days.

(21) Appl. No.: 12/361,169

(22) Filed: Jan. 28, 2009

(51) Int. Cl.
- *G06F 15/173* (2006.01)
- *G06F 9/00* (2006.01)
- *G06F 1/24* (2006.01)
- *G06F 1/00* (2006.01)

(52) U.S. Cl. ............... 709/224; 709/223; 713/1; 713/2; 713/300; 713/500

(58) Field of Classification Search ............ 713/1, 300, 713/310, 320, 330, 340; 709/220–224
See application file for complete search history.

(56) References Cited

U.S. PATENT DOCUMENTS

| | | | |
|---|---|---|---|
| 7,505,415 B2 * | 3/2009 | Murgatroyd et al. | 370/241 |
| 7,793,122 B1 * | 9/2010 | Manuilov | 713/300 |
| 2003/0028633 A1 * | 2/2003 | Lindsay et al. | 709/224 |
| 2003/0231594 A1 * | 12/2003 | Xu et al. | 370/236 |
| 2004/0199599 A1 * | 10/2004 | Nichols et al. | 709/208 |
| 2005/0210101 A1 * | 9/2005 | Janik | 709/203 |
| 2006/0059253 A1 * | 3/2006 | Goodman et al. | 709/223 |
| 2007/0162732 A1 * | 7/2007 | Diwan et al. | 713/1 |
| 2007/0174616 A1 * | 7/2007 | Buer | 713/168 |
| 2007/0180092 A1 * | 8/2007 | Roth et al. | 709/223 |
| 2007/0185984 A1 * | 8/2007 | Roth | 709/223 |
| 2008/0028053 A1 * | 1/2008 | Kelley et al. | 709/222 |
| 2008/0168127 A1 * | 7/2008 | Hernandez | 709/202 |
| 2008/0244302 A1 * | 10/2008 | Khatri et al. | 713/502 |
| 2009/0132840 A1 * | 5/2009 | Talwar et al. | 713/320 |

OTHER PUBLICATIONS

Bob Blair, Jon Haas, "Systems Management Architecture for Mobile and Desktop Hardware," Feb. 26, 2007, Distributed Management Task Force, Inc, Version 1.0.01i, pp. 1-42.*

* cited by examiner

*Primary Examiner* — Joseph Avellino
*Assistant Examiner* — Aftab Nasir Khan
(74) *Attorney, Agent, or Firm* — Advantedge Law Group

(57) ABSTRACT

A computer-implemented method for evaluating the startup performance of a remote computing system may comprise: 1) commanding the remote computing system to power on using an out-of-band remote-management protocol, 2) determining when the remote computing system becomes responsive to an in-band remote-management protocol, and then 3) calculating the amount of time that elapsed between when the remote computing system was commanded to power on and when the remote computing system became responsive to the in-band protocol. Similarly, a method for evaluating the shutdown performance of a remote computing system may comprise: 1) commanding the remote computing system to shut down using an in-band remote-management protocol, 2) determining when the remote computing system has powered off using an out-of-band remote-management protocol, and then 3) calculating the amount of time that elapsed between when the remote computing system was commanded to shut down and when the remote computing system powered off.

19 Claims, 7 Drawing Sheets

SYSTEMS AND METHODS FOR EVALUATING THE PERFORMANCE OF REMOTE COMPUTING SYSTEMS

BACKGROUND

The amount of time required for a computing system to power on, power off, or reboot depends greatly on the number of applications, services, or drivers loaded or running on the computing system. In order to evaluate the shutdown or startup performance of a computing system, an administrator may measure the startup and shutdown times of a computing system using local tools that are installed on, specifically designed for, and dependent on the operating system running on the computing system.

Unfortunately, because these local tools are unable to respond to incoming requests when the computing system's operating system is in the process of starting up or shutting down, administrators lack the means for remotely evaluating the startup and shutdown performance of remotely-managed computing systems.

SUMMARY

As will be described in greater detail below, the instant disclosure generally relates to systems and methods for evaluating the performance of remote computing systems using both in-band and out-of-band remote-management protocols.

For example, in one embodiment a method for evaluating the startup performance of a remote computing system may comprise: 1) commanding a remote computing system to power on using an out-of-band remote-management protocol (such as AMT, ASF, or DASH), 2) determining, by monitoring the remote computing system, when the remote computing system becomes responsive to in-band remote-management protocols (such as WMI), and then 3) calculating the amount of time that elapsed between when the remote computing system was commanded to power on and when the remote computing system became responsive to the in-band remote-management protocol.

Similarly, the system may evaluate the shutdown performance of a remote computing system by: 1) commanding a remote computing system to shut down using an in-band remote-management protocol, 2) determining, by monitoring the remote computing system using an out-of-band remote-management protocol, when the remote computing system has powered off, and then 3) calculating the amount of time that elapsed between when the remote computing system was commanded to shut down and when the remote computing system powered off.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
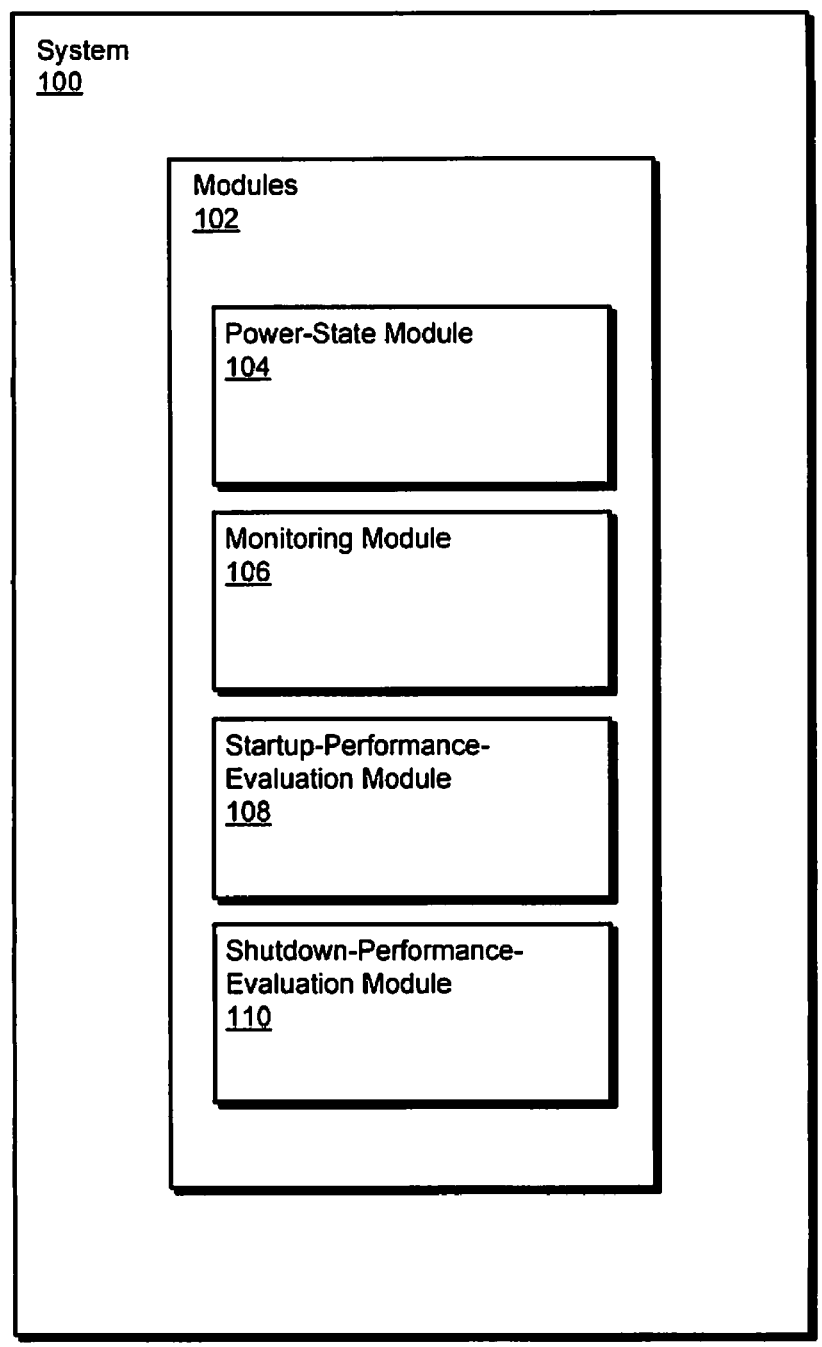
FIG. 1 is a block diagram of an exemplary system for evaluating the performance of remote computing systems according to at least one embodiment.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for remotely evaluating the performance of computing systems using both in-band and out-of-band remote-management protocols. The phrase "in-band remote-management protocol," as used herein, generally refers to any remote-management protocol that is dependent upon a remote computing system's operating system for operation. Examples of in-band remote-management protocols include, without limitation, WINDOWS Management Instrumentation (WMI), Standards-Based LINUX Instrumentation for Manageability (SBLIM), or any other remote-management protocol that may be used, in combination with a remote computing system's operating system, to manage the remote computing system.

In addition, the phrase "out-of-band remote-management protocol," as used herein, generally refers to any remote-management protocol that operates independent of a remote computing system's operating system. Examples of out-of-band remote-management protocols include, without limitation, Active Management Technology (AMT), Alert Standard Format (ASF), Desktop and Mobile Architecture for Systems Management Hardware (DASH), or any other remote-management protocol that operates independent of a remote computing system's operating system. Generally speaking, in-band remote-management protocols are typically only available when a remote computing system's operating system is initialized and functional, while out-of-band remote-management protocols are typically available at all times, including when the remote computing system is powered off.

Figure 2:
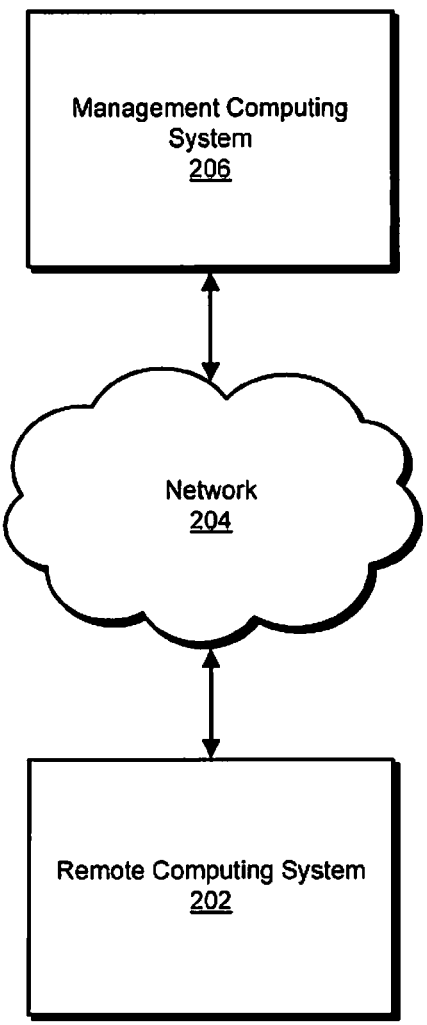
FIG. 2 is a block diagram of an exemplary system for evaluating the performance of remote computing systems according to an additional embodiment.

The following will provide, with reference to FIGS. 1-2, detailed descriptions of exemplary systems for evaluating the performance of remote computing systems. Detailed descriptions of corresponding computer-implemented methods will be provided in connection with FIGS. 3-5. In addition, detailed descriptions of an exemplary computing system and network architecture capable of implementing one or more of the embodiments described herein will be provided in connection with FIGS. 6-7, respectively.

FIG. 1 is a block diagram of an exemplary system 100 for evaluating the performance of remote computing systems. As illustrated in this figure, exemplary system 100 may comprise one or more modules for performing one or more tasks. For example, and as will be explained in greater detail below, exemplary system 100 may comprise a power-state module 104 programmed to command remote computing systems to startup and shutdown using in-band or out-of-band remote-management protocols. Exemplary system 100 may also comprise a monitoring module 106 programmed to determine, using in-band or out-of-band remote-management protocols, when a remote computing system has completed a startup or shutdown operation.

Exemplary system 100 may also comprise a startup-performance-evaluation module 108 programmed to determine the startup performance of remote computing systems. Exemplary system 100 may also comprise a shutdown-performance-evaluation module 110 programmed to determine the shutdown performance of remote computing systems. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules configured to run on one or more computing devices, such as the devices illustrated in FIG. 2 (e.g., management computing system 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

FIG. 2 is a block diagram of an exemplary system 200 for evaluating the performance of remote computing systems. As illustrated in this figure, exemplary system 200 may comprise a management computing system 206 in communication with a remote computing system 202 via a network 204. In one embodiment, and as will be described in greater detail below, management computing system 206 may evaluate the performance of remote computing system 202 using both in-band and out-of-band remote-management protocols.

Remote computing system 202 generally represents any type or form of computing device capable of reading computer-executable instructions. Examples of computing system 202 include, without limitation, laptops, desktops, servers, cellular phones, personal digital assistants (PDAs), multimedia players, embedded systems, combinations of one or more of the same, exemplary computing system 610 in FIG. 6, or any other suitable computing device. Similarly, management computing system 206 generally represents any type or form of computing device that is capable of remotely managing a computing system, such as remote computing system 202.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., GSN Network), exemplary network architecture 700 in FIG. 7, or the like. Network 204 may facilitate communication or data transfer using wireless or wired connections. In one embodiment, network 204 may facilitate in-band and/or out-of-band remote-management-protocol communication between management computing system 206 and remote computing system 202.

Figure 3:
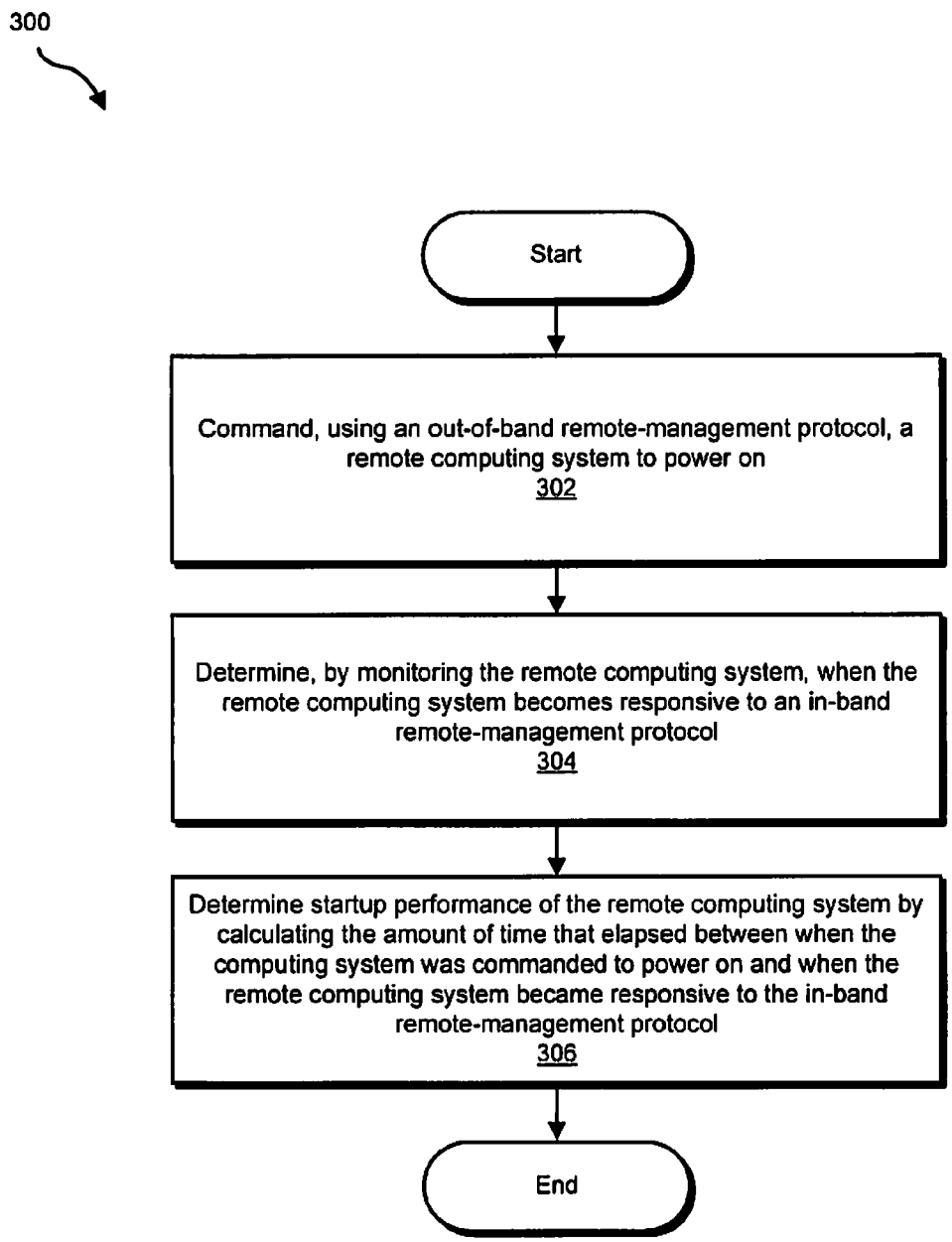
FIG. 3 is a flow diagram of an exemplary computer-implemented method for evaluating the startup performance of remote computing systems.

FIG. 3 is a flow diagram of an exemplary computer-implemented method 300 for evaluating the performance of remote computing systems. As illustrated in this figure, at step 302 the system may command a remote computing system to power on using an out-of-band remote-management protocol. For example, management computing system 206 in FIG. 2 (which may, as detailed above, comprise power-state module 104 in FIG. 1) may command remote computing system 202 to power on using an out-of-band remote-management protocol. As detailed above, examples of out-of-band remote-management protocols include, without limitation, AMT, ASF, and DASH. In some embodiments, these out-of-band remote-management protocols may represent hardware-based remote-management protocols that do not depend on the presence of an operating system or other locally-installed management agent on the remote computing system.

In some embodiments, the system may receive updates via the out-of-band remote-management protocol that identify the startup progress of the remote computing system. For example, management computing system 206 in FIG. 2 may receive AMT, ASF, or DASH-based boot-progress-event updates that detail the boot progress of remote computing system 202.

At step 304, the system may determine, by monitoring the remote computing system, when the remote computing system becomes responsive to an in-band remote-management protocol. For example, management computing system 206 in FIG. 2 (which may, as detailed above, comprise monitoring module 106 in FIG. 1) may monitor remote computing system 202 in order to determine when remote computing system 202 becomes responsive to an in-band remote-management protocol. As detailed above, examples of in-band remote-management protocols include, without limitation, WMI, SBLIM, or any other remote-management protocol that is only available when the remote computing system's operating system is fully initialized and functional.

The system may perform step 304 in a variety of ways. In one example, management computing system 206 may perform step 304 by determining when a TCP port on the remote computing system that is required for in-band communication becomes available. For example, if a WINDOWS operating system is installed on remote computing system 202 in FIG. 2, then management computing system 206 may determine, by monitoring remote computing system 202, when TCP port 135 on remote computing system 202 becomes available. In this example, the availability of TCP port 135 on remote computing system 202 may indicate the presence and availability of the in-band protocol WMI.

At step 306, the system may determine the startup performance of the remote computing system by calculating the amount of time that elapsed between when the computing system was commanded to power on (step 302) and when the remote computing system became response to the in-band remote-management protocol (step 304). For example, management computing system 206 in FIG. 2 (which may, as detailed above, comprise startup-performance-evaluation module 108 in FIG. 1) may determine the startup performance of remote computing system 202 by calculating the amount of time that elapsed between step 302 and step 304.

Figure 4:
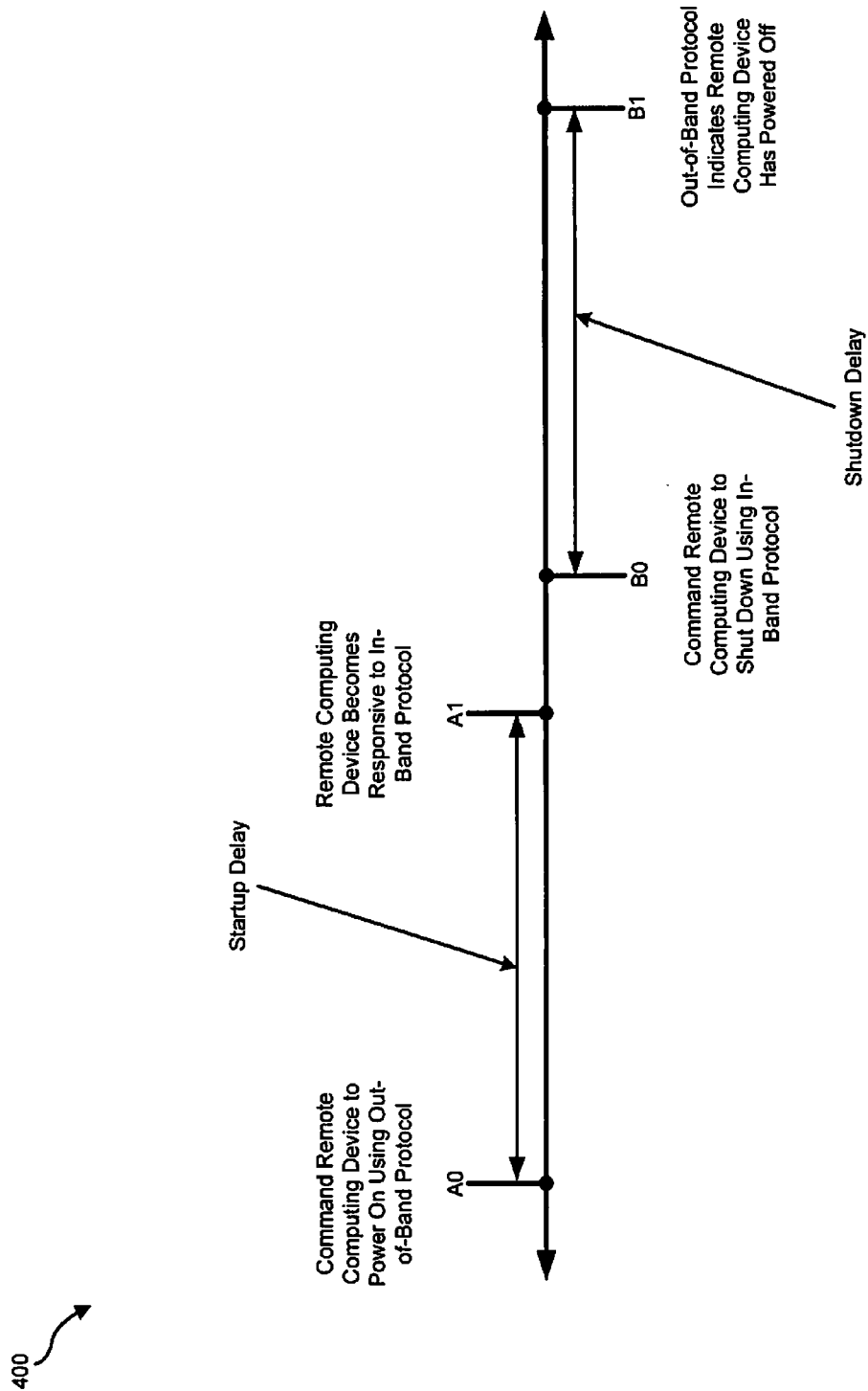
FIG. 4 is an exemplary timing diagram for evaluating the performance of remote computing systems.

For example, as illustrated in FIG. 4, at time A0 (step 302 in FIG. 3) management computing system 206 in FIG. 2 may command remote computing system 202 to power on using an out-of-band remote-communication protocol, such as AMT, ASF, or DASH. At time A1 (step 304 in FIG. 3), management computing system 206 may determine, by monitoring remote computing system 202, that remote computing system 202 has become responsive to an in-band protocol, such as WMI or SBLIM. In this example, management computing system 206 may evaluate the startup performance of remote computing system 202 by measuring the amount of time that elapsed between time A0 and time A1 (also known as "startup delay"). Upon completion of step 306, exemplary method 300 in FIG. 3 may terminate.

Figure 5:
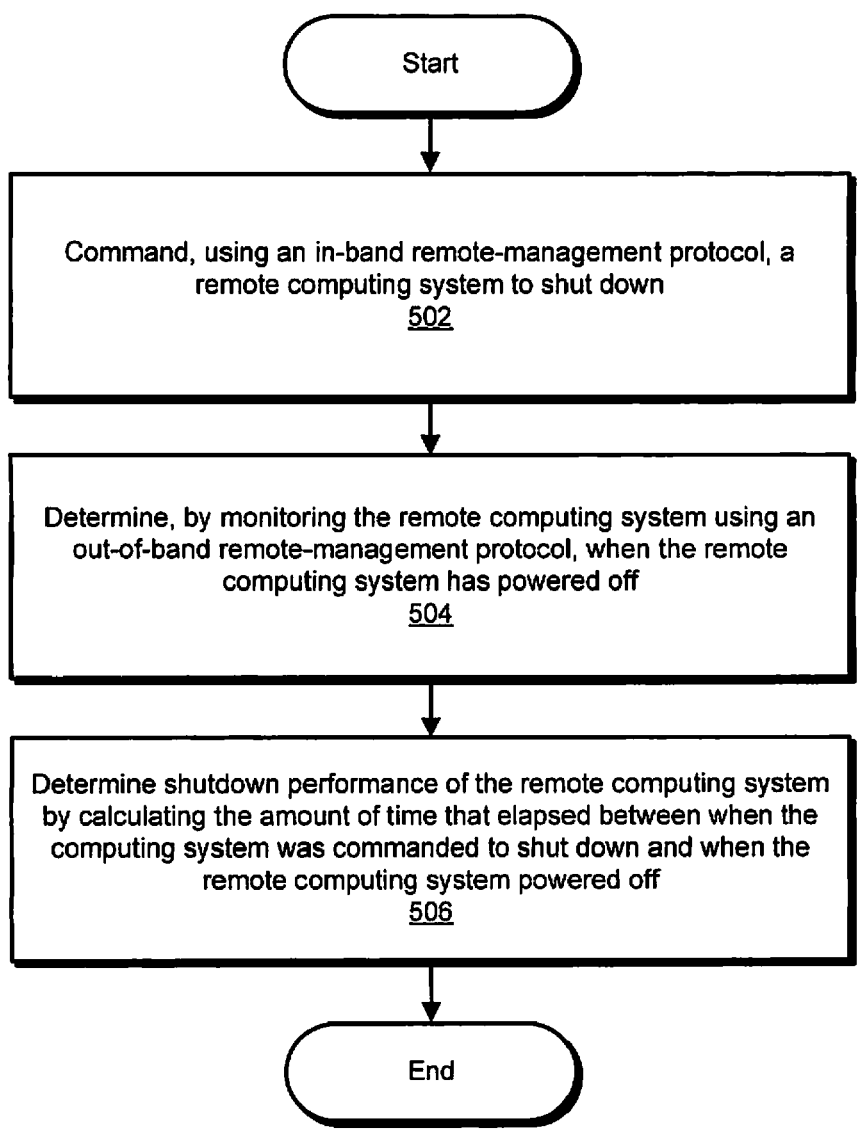
FIG. 5 is a flow diagram of an exemplary computer-implemented method for evaluating the shutdown performance of remote computing systems.

In certain embodiments, exemplary system 100 and FIG. 1 may also be used to evaluate the shutdown performance of a remote computing system. FIG. 5 is a flow diagram of an exemplary computer-implemented method 500 for evaluating the shutdown performance of remote computing systems. As illustrated in this figure, at step 502 the system may command a remote computing system to shut down using an in-band remote-management protocol. For example, management computing system 206 in FIG. 2 (which may, as detailed above, comprise power-state module 104 in FIG. 1) may command remote computing system 202 to shut down using an in-band remote-management protocol such as WMI or SBLIM.

At step 504, the system may determine, by monitoring the remote computing system using an out-of-band remote-management protocol, when the remote computing system has powered off. For example, management computing system 206 in FIG. 2 (which may, as detailed above, comprise monitoring module 106 in FIG. 1) may determine when remote computing system 202 has powered off using an out-of-band remote-management protocol, such as AMT, ASF, or DASH.

The system may perform step 504 in a variety of ways. In one example, management computing system 206 may constantly check the power state of remote computing system 202 using out-of-band remote-management protocols such as AMT, ASF, or DASH. When these out-of-band remote-management protocols report that computing system 202 has powered off, step 504 may terminate.

At step 506, the system may determine or evaluate the shutdown performance of the remote computing system by calculating the amount of time that elapsed between when the computing system was commanded to shut down and when the remote computing system powered off. For example, management computing system 206 in FIG. 2 (which may, as detailed above, comprise shutdown-performance-evaluation module 110 in FIG. 1) may evaluate the shutdown performance of remote computing system 202 by calculating the amount of time that elapsed between steps 502 and 504.

For example, as illustrated in FIG. 4, at time B0 (step 502 in FIG. 5) management computing system 206 may command remote computing system 202 to shut down using an in-band protocol, such as WMI. At time B1 (step 504 in FIG. 5), an out-of-band protocol (such as AMT, ASF, or DASH) may indicate that remote computing system 202 has powered off. In this example, management computing system 206 may evaluate the shutdown performance of remote computing system 202 by calculating the amount of time that elapsed between time B0 and time B1. Upon completion of step 506 in FIG. 5, exemplary method 500 may terminate.

The systems and methods described herein may provide a reliable way to measure the shutdown and startup performance of a remote computing system, even if the remote computing system's operating system is in the process of starting up or shutting down. As such, these systems and methods may enable administrators to remotely manage virtually any computing system, regardless of the computing system's operating system or power state.

Figure 6:
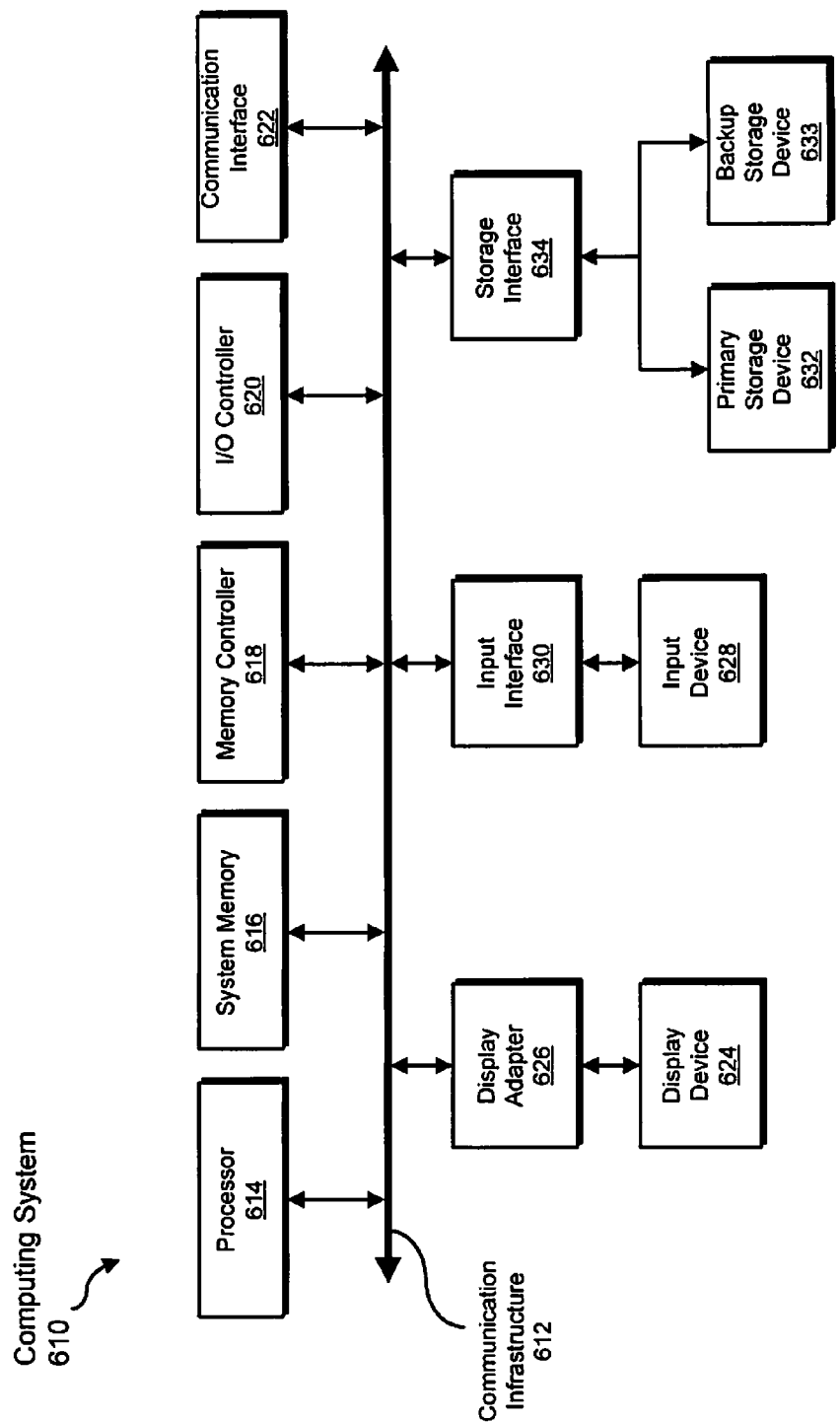
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may comprise at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the commanding, determining, monitoring, using, calculating, and receiving steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may comprise both a volatile memory unit (such as, for example, system memory 616) and a non-volatile storage device (such as, for example, primary storage device 632, as described in detail below).

In certain embodiments, exemplary computing system 610 may also comprise one or more components or elements in addition to processor 614 and system memory 616. For example, as illustrated in FIG. 6, computing system 610 may comprise a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller may perform and/or be a means for performing, either alone or in combination with other elements, one or more of the steps or features described and/or illustrated herein, such as commanding, determining, monitoring, using, calculating, and receiving.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for performing, either alone or in combination with other elements, one or more of the commanding, determining, monitoring, using, calculating, and receiving steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network comprising additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 694 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the commanding, determining, monitoring, using, calculating, and receiving steps disclosed herein. Communication interface 622 may also be used to perform and/or be a means for performing other steps and features set forth in the instant disclosure.

As illustrated in FIG. 6, computing system 610 may also comprise at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also comprise at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the commanding, determining, monitoring, using, calculating, and receiving steps disclosed herein. Input device 628 may also be used to perform and/or be a means for performing other steps and features set forth in the instant disclosure.

As illustrated in FIG. 6, exemplary computing system 610 may also comprise a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also comprise other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

In certain embodiments, storage devices 632 and 633 may be used, for example, to perform and/or be a means for performing, either alone or in combination with other elements, one or more of the commanding, determining, monitoring, using, calculating, and receiving steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
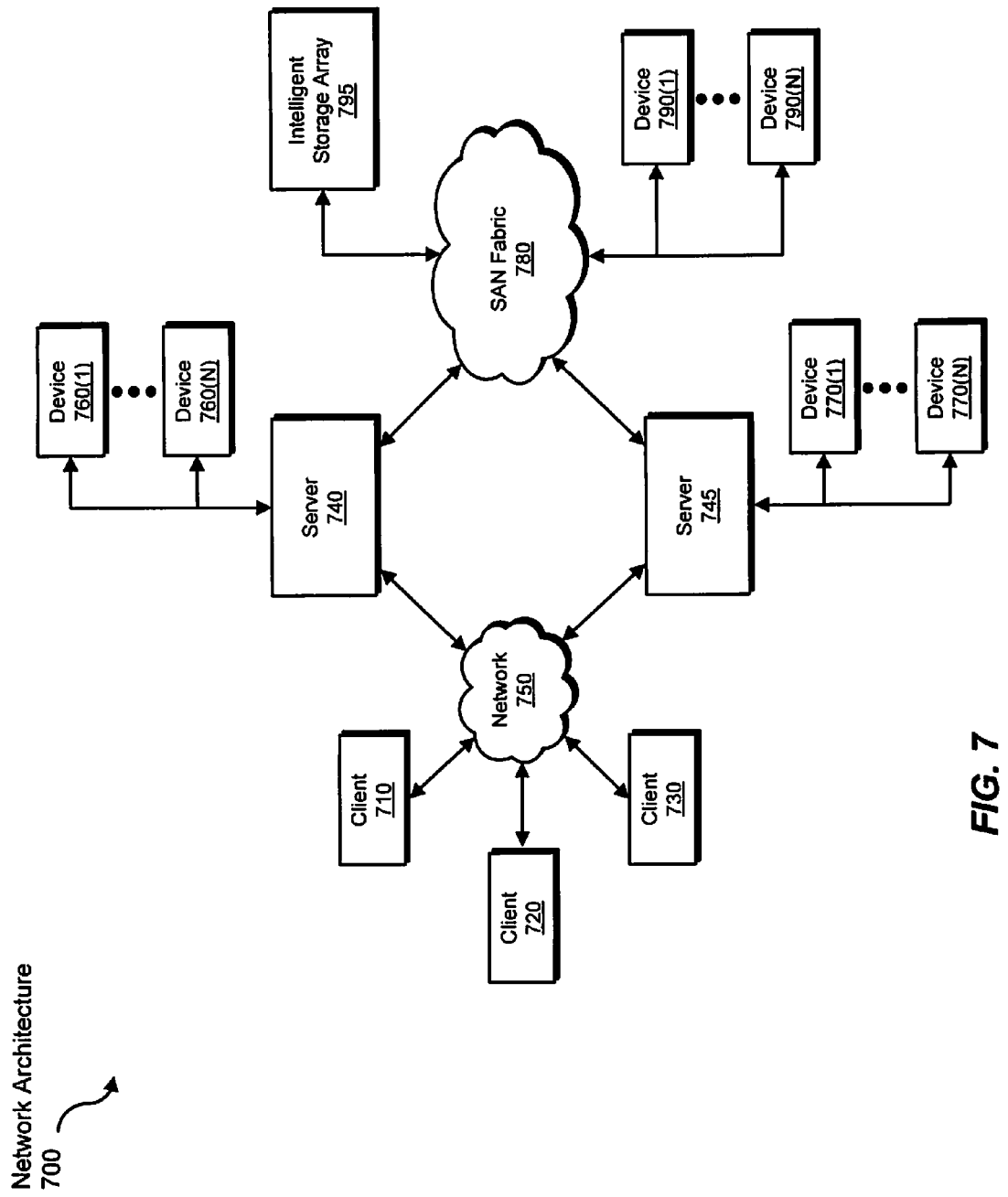
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing, either alone or in combination with other elements, one or more of the commanding, determining, monitoring, using, calculating, and receiving steps disclosed herein. Network architecture 700 may also be used to perform and/or be a means for performing other steps and features set forth in the instant disclosure.

As detailed above, computing system 610 and/or one or more components of network architecture 700 may perform and/or be a means for performing, either alone or in combination with other elements, one or more steps of an exemplary method for evaluating the performance of remote computing systems. In one example, such a method may comprise: 1) commanding, using an out-of-band remote-management protocol, a remote computing system to power on, 2) determining, by monitoring the remote computing system, when the remote computing system becomes responsive to an in-band remote-management protocol, and then 3) determining the startup performance of the remote computing system by calculating the amount of time that elapsed between when the remote computing system was commanded to power on and when the remote computing system became responsive to the in-band remote-management protocol.

Examples of out-of-band remote-management protocols include, without limitation, AMT, ASF, and DASH. In some embodiments, the out-of-band remote-management protocol may comprise a hardware-based remote-management protocol. Similarly, examples of in-band remote-management protocols include, without limitation, WMI and SBLIM. In some examples, the in-band remote-management protocol may comprise a software-based remote-management protocol.

In one embodiment, determining when the remote computing system becomes responsive to the in-band remote-management protocol may comprise determining, by monitoring a TCP port on the remote computing system, when the TCP port becomes available. In addition, monitoring the remote computing system may comprise receiving progress updates via the out-of-band remote-management protocol.

The method may also comprise: 1) commanding, using the in-band remote-management protocol, the remote computing system to shut down, 2) determining, by monitoring the remote computing system using the out-of-band remote-management protocol, when the remote computing system has powered off, and then 3) determining the shutdown performance of the remote computing system by calculating the amount of time that elapsed between when the remote computing system was commanded to shut down and when the remote computing system powered off.

In some examples, monitoring the remote computing system using the out-of-band remote-management protocol may comprise monitoring the power state of the remote computing system using the out-of-band remote-management protocol. In addition, determining when the remote computing system has powered off may comprise receiving, via the out-of-band remote-management protocol, a power-state update that indicates that the remote computing system has powered off.

In an additional embodiment, a method for evaluating the shutdown performance of remote computing systems may comprise: 1) commanding, using an in-band remote-management protocol, a remote computing system to shut down, 2) determining, by monitoring the remote computing system using an out-of-band remote-management protocol, when the remote computing system has powered off, and then 3) determining the shutdown performance of the remote computing system by calculating the amount of time that elapsed between when the remote computing system was commanded to shut down and when the remote computing system powered off.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for evaluating the performance of remote computing systems, the method comprising:
commanding, using an out-of-band remote-management protocol, a remote computing system to power on;
determining, by monitoring the remote computing system, when the remote computing system becomes responsive to an in-band remote-management protocol;
determining startup performance of the remote computing system by calculating the amount of time that elapsed between when the remote computing system was commanded to power on and when the remote computing system became responsive to the in-band remote-management protocol;
wherein determining when the remote computing system becomes responsive to the in-band remote-management protocol comprises determining, by monitoring a TCP port on the remote computing system, when the TCP port becomes available.

2. The method of claim 1, wherein the out-of-band remote-management protocol comprises one of:
AMT;
ASF;
DASH.

3. The method of claim 1, wherein the out-of-band remote-management protocol comprises a hardware-based remote-management protocol.

4. The method of claim 1, wherein the in-band remote-management protocol comprises one of:
WMI;
SBLIM.

5. The method of claim 1, wherein the in-band remote-management protocol comprises a software-based remote-management protocol.

6. The method of claim 1, wherein monitoring the remote computing system comprises receiving progress updates via the out-of-band remote-management protocol.

7. The method of claim 1, further comprising:
commanding, using the in-band remote-management protocol, the remote computing system to shut down;
determining, by monitoring the remote computing system using the out-of-band remote-management protocol, when the remote computing system has powered off;
determining shutdown performance of the remote computing system by calculating the amount of time that elapsed between when the remote computing system was commanded to shut down and when the remote computing system powered off.

8. The method of claim 7, wherein monitoring the remote computing system using the out-of-band remote-management protocol comprises monitoring the power state of the remote computing system using the out-of-band remote-management protocol.

9. The method of claim 7, wherein determining when the remote computing system has powered off comprises receiving, via the out-of-band remote-management protocol, a power-state update that indicates that the remote computing system has powered off.

10. A computer-implemented method for evaluating the performance of remote computing systems, the method comprising:
commanding, using an in-band remote-management protocol, a remote computing system to shut down;
determining, by monitoring the remote computing system using an out-of-band remote-management protocol, when the remote computing system has powered off;

determining shutdown performance of the remote computing system by calculating the amount of time that elapsed between when the remote computing system was commanded to shut down and when the remote computing system powered off wherein determining when the remote computing system has powered off comprises receiving, via the out-of-band remote-management protocol, a power-state update that indicates that the remote computing system has powered off.

11. The method of claim 10, further comprising:

commanding, using the out-of-band remote-management protocol, the remote computing system to power on;

determining, by monitoring the remote computing system, when the remote computing system becomes responsive to the in-band remote-management protocol;

determining startup performance of the remote computing system by calculating the amount of time that elapsed between when the remote computing system was commanded to power on and when the remote computing system became responsive to the in-band remote-management protocol.

12. A system for evaluating the performance of remote computing systems, the system comprising:

a power-state module programmed to command, using an out-of-band remote-management protocol, a remote computing system to power on;

a monitoring module programmed to determine, by monitoring the remote computing system, when the remote computing system becomes responsive to an in-band remote-management protocol wherein the monitoring module determines when the remote computing system becomes responsive to the in-band remote-management protocol by determining, by monitoring a TCP port on the remote computing system, when the TCP port becomes available;

a startup-performance-evaluation module programmed to determine startup performance of the remote computing system by calculating the amount of time that elapsed between when the remote computing system was commanded to power on and when the remote computing system became responsive to the in-band remote-management protocol; and at least one processor configured to execute at least one of the power-state module, the monitoring module, and the startup-performance-evaluation module.

13. The system of claim 12, wherein the out-of-band remote-management protocol comprises one of:

AMT;
ASF;
DASH.

14. The system of claim 12, wherein the out-of-band remote-management protocol comprises a hardware-based remote-management protocol.

15. The system of claim 12, wherein the in-band remote-management protocol comprises one of:

WMI;
SBLIM.

16. The system of claim 12, wherein the in-band remote-management protocol comprises a software-based remote-management protocol.

17. The system of claim 12, wherein the power-state module is further programmed to command, using the in-band remote-management protocol, the remote computing system to shut down.

18. The system of claim 17, wherein the monitoring module is further programmed to determine, by monitoring the remote computing system using the out-of-band remote-management protocol, when the remote computing system has powered off.

19. The system of claim 18, further comprising a shutdown-performance-evaluation module programmed to determine shutdown performance of the remote computing system by calculating the amount of time that elapsed between when the remote computing system was commanded to shut down and when the remote computing system powered off.

* * * * *